W. B. STOUT.
AIRCRAFT.
APPLICATION FILED NOV. 27, 1917.
1,377,858.
Patented May 10, 1921.
3 SHEETS—SHEET 1.
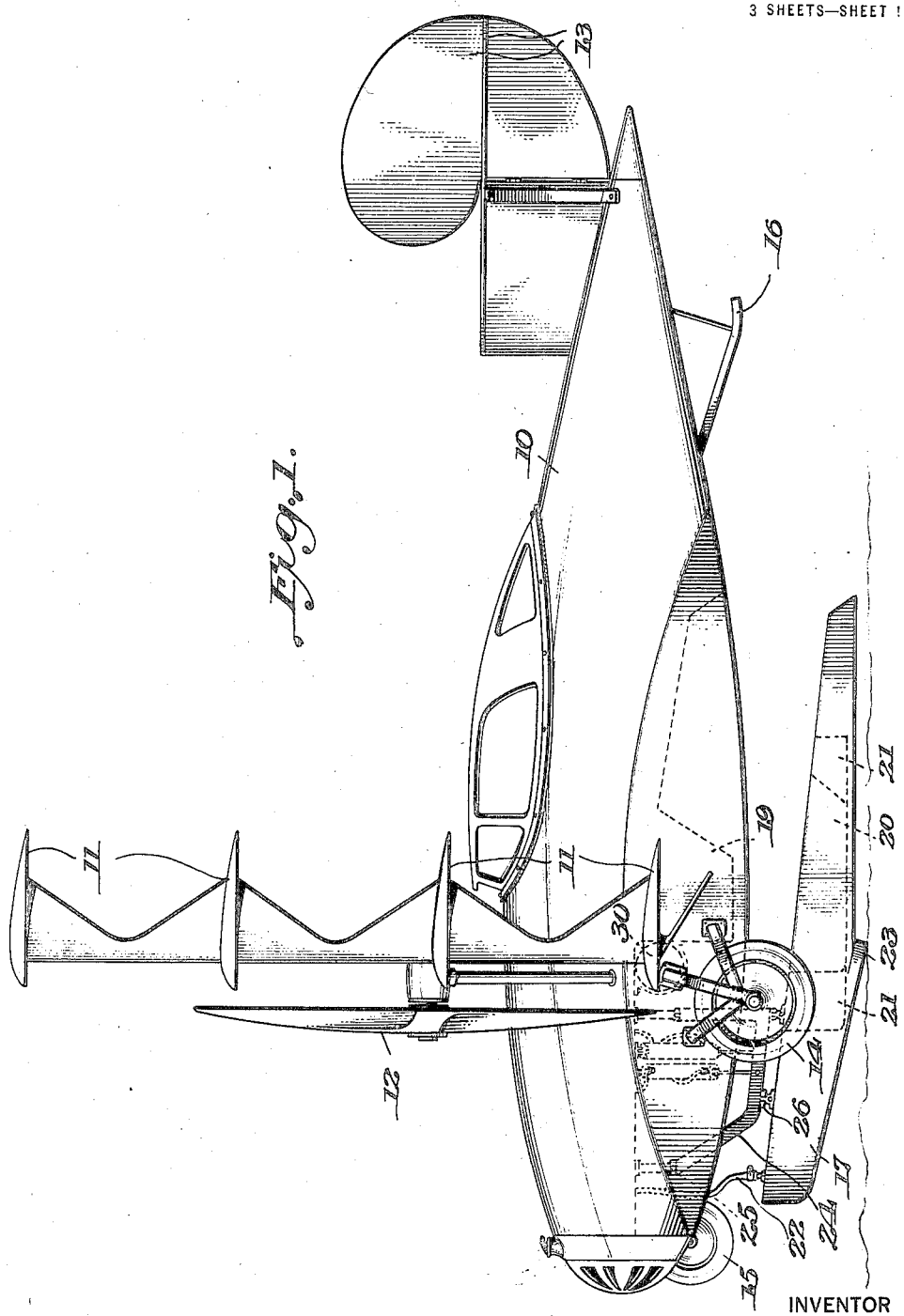
INVENTOR
William B. Stout,
BY
ATTORNEY

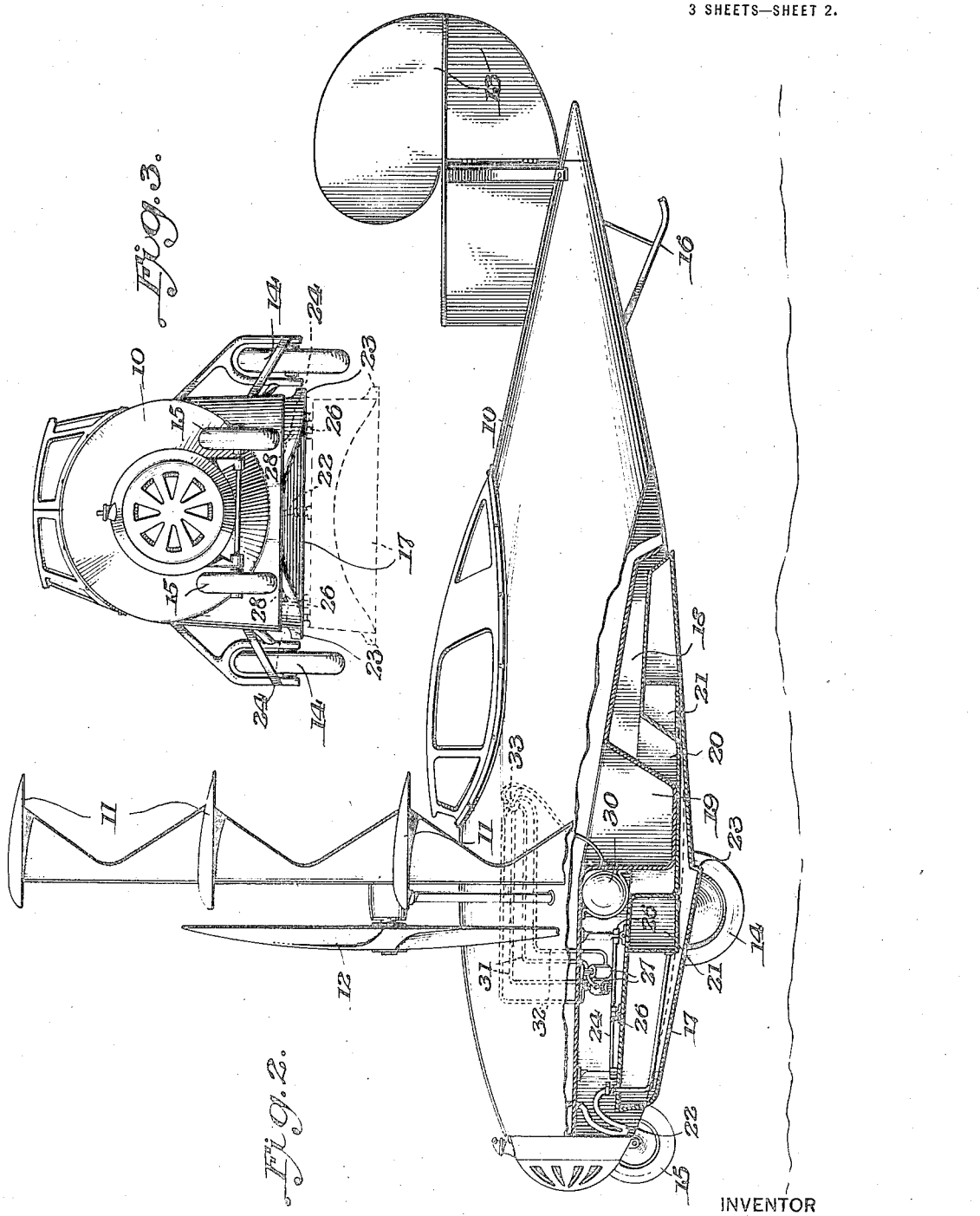

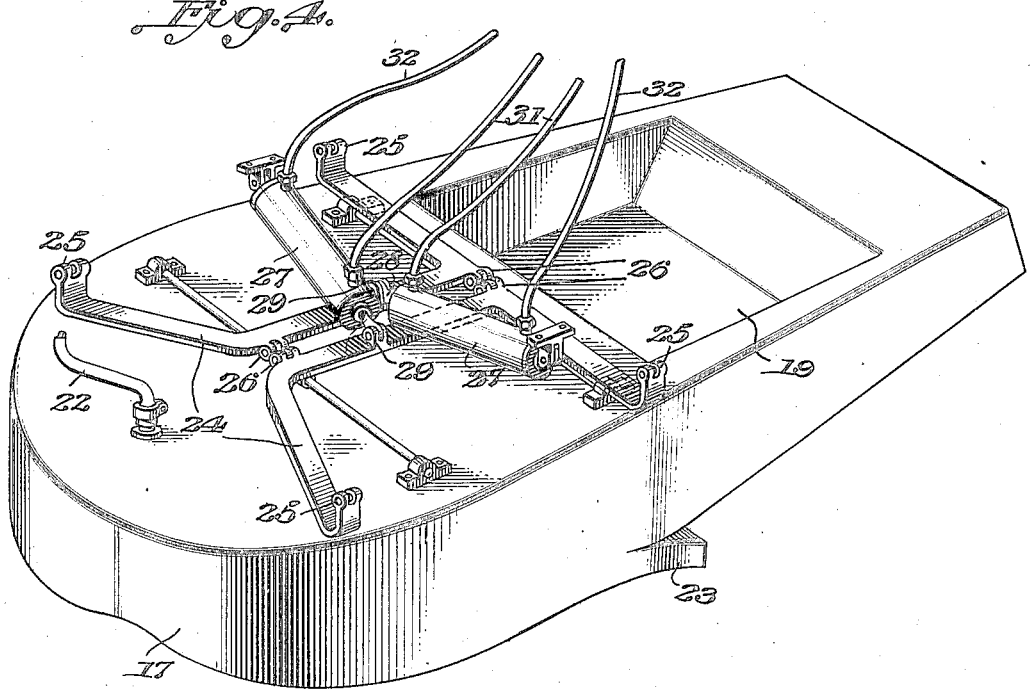
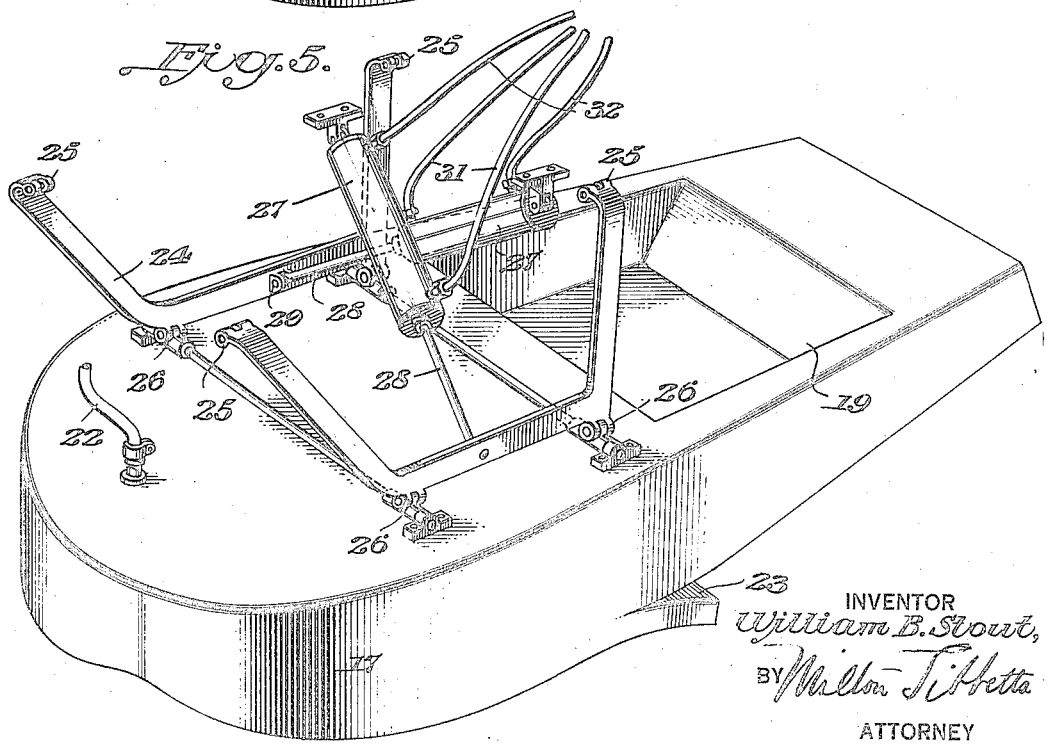

UNITED STATES PATENT OFFICE.

WILLIAM B. STOUT, OF DETROIT, MICHIGAN, ASSIGNOR TO PACKARD MOTOR CAR COMPANY, OF DETROIT, MICHIGAN, A CORPORATION OF MICHIGAN.

AIRCRAFT.

1,377,858.   Specification of Letters Patent.   Patented May 10, 1921.

Application filed November 27, 1917. Serial No. 204,232.

*To all whom it may concern:*

Be it known that I, WILLIAM B. STOUT, a citizen of the United States, and resident of Detroit, Wayne county, State of Michigan, have invented certain new and useful Improvements in Aircraft, of which the following is a specification.

This invention relates to aircraft and particularly to the body or fuselage and the float connected thereto. The invention is shown herein as embodied in an airplane adapted for rising from and alighting upon either land or water.

One of the objects of the invention is to produce an aircraft adapted for landing on either land or water, and in which the water landing gear is movable to an inoperative position to permit use of the other landing gear.

Another object of the invention is to provide an aircraft with a movably mounted float so that the float may be drawn up close to the body when not in use for rising from or landing upon the water.

Another object of the invention is to provide an aircraft with a body having a recess therein and with a float adapted to be drawn up into the recess to thereby reduce head resistance when the craft is in the air.

Other objects of the invention will appear from the following description taken in connection with the drawings which form a part of this specification, and in which:

Figure 1 is a side elevation of an aircraft embodying the invention;

Fig. 2 is a view similar to Fig. 1 with some of the parts in section and showing the float in folded or inoperative position;

Fig. 3 is front view of the airplane shown in Figs. 1 and 2 with the float shown in dotted lines in operative position;

Fig. 4 is an enlarged perspective view of the float and the means for connecting it to the body or fuselage of the aircraft; and Fig. 5 is a view similar to Fig. 4 with the connecting linkage in extended position.

Referring to the drawings, 10 represents the fuselage or body of an airplane, and 11 are the wings or planes thereof. One of the two propellers is shown at 12 and the tail fins are indicated at 13.

The body is provided with two sets of landing gear, one for landing or running on the land, as the wheels 14 and 15 and the skid 16, and the other for landing or running on the surface of the water, as the float 17. It will be seen that the wheels 14 are separated considerably and the float 17 is arranged between them.

The float 17 is so connected to the body or fuselage that it is movable relative to the latter and may be drawn toward the body to an inoperative position between the wheels 14. In Fig. 1 the float is shown in operative position and in Fig. 2 it is drawn up under the body into inoperative position. Also Fig. 3 shows the float in inoperative position in full lines and in operative position in dotted lines. This movable arrangement of the float relative to the body has two important functions—first, it provides both land and water landing gear arranged somewhat closer to the body than would otherwise be possible, and, second, it materially reduces the head resistance after the craft is in the air by reason of the fact that the float may be drawn into a recess formed in the lower part of the body. This of course permits greater speed and activity.

As shown herein, the body 10 is formed with a recess 18 in its lower portion and into this recess the float 17 is adapted to fold or be moved when in its inoperative position. To prevent too great an encroachment upon the operator's space by the formation of the recess 18 in the body a cockpit 19 is made to extend into the recess to thereby provide space for the operaor's feet, and the float 17 is formed with a recess 20 to receive the cockpit 19 when the float is in its folded position, as shown in Fig. 2. Thus the float nests into the recess 18 and the cockpit nests into the recess 20 of the float and very little if any of the float extends below the lower fuselage lines of the body, whereby the head resistance of the craft is but very little increased by the float when in its folded position.

In order that the space within the body may be further conserved, the fuel tank or one of the fuel tanks of the craft may be carried by the float 17 and in the present embodiment of the invention this tank is shown as of recessed form as at 21, and with the float in folded position the tank surrounds the cockpit 19 and in fact forms the recess 20 of the float. The tank is connected to the body for supplying the motor by any suitable connection such as a flexible hose 22.

The float 17 is formed with the usual step 23 about midway of its length and it will be understood that this step must be approximately in line with the center of buoyancy of the craft when the float is in its operative position. It is so shown in Fig. 1, and in order to prevent unbalancing of the craft as the float is folded it is so connected with the fuselage that it moves toward the fuselage in the general line of said center of buoyancy. Thus the connection comprises a pair of links 24 pivotally connected to the body as at 25 and having a transverse sliding connection 26 with the float 17. Air cylinders 27 are also pivotally connected to the body and their piston rods 28 are pivotally connected to the links 24 as at 29 so that by admission of air from an air tank 30 through pipes 31 will draw the links and consequently the float to the folded position shown in Figs. 2, 3 and 4, and admission of air to the opposite ends of the cylinders through pipes 32 will extend the links 24 as shown in Figs. 1 and 5 and cause the float to be dropped to its operative position as shown in Fig. 1. A valve 33 conveniently located for the operator controls the admission of air to the cylinders 27. The air tank 30 may be supplied with air by any suitable means such as a pump from the motor, not shown.

It will be understood that with the float in its folded position as shown in Fig. 2 the craft may rest upon land and may rise from and land upon land, while with the float in its operative position as shown in Fig. 1 the craft may rest upon the surface of the water or it may rise from or land upon the water. After the craft has risen from the water the float may be drawn up into the recess in the body to thereby reduce the head resistance and give greater speed and flexibility to the movements of the craft.

It will be further understood that other forms than those shown may be used without departing from the spirit or scope of this invention.

Having thus described my invention, what I claim and desire to secure by Letters Patent is:—

1. In an aircraft, the combination with a body having a recess and a cockpit extending into the recess, of a float adapted to nest in said recess and having a recess to receive said cockpit.

2. In an aircraft, the combination with a body having a cockpit, of a movable float adapted to be brought up close to the body and having a recess to receive said cockpit.

3. In an aircraft, the combination with a body having a cockpit, of a float connected to the body and movable to two positions relative thereto, said float being adapted to nest with said cockpit when in inoperative position and to be arranged below it when in operative position.

4. In an aircraft, the combination with the body thereof having a cockpit, of a float having a fuel tank surrounding the cockpit when the float is in position close to the body.

5. In an aircraft, the combination with the body thereof having a cockpit, of a float having a fuel tank arranged therein, said tank having a recess, and means for moving the float close to the body with the cockpit in said recess.

6. In an aircraft, the combination with the body thereof, of a float, and connections between the body and float comprising links pivoted to one member and slidably connected to the other member, said links extending transversely of said members, and means to slide said links to draw the float toward the body.

7. In an aircraft, the combination with the body thereof, of a float, and connections between the body and float comprising transversely disposed links pivoted to one member and slidably connected to the other member, and air cylinder means to slide said links to draw the float toward the body.

In testimony whereof I affix my signature.

WILLIAM B. STOUT.